Patented Jan. 22, 1935

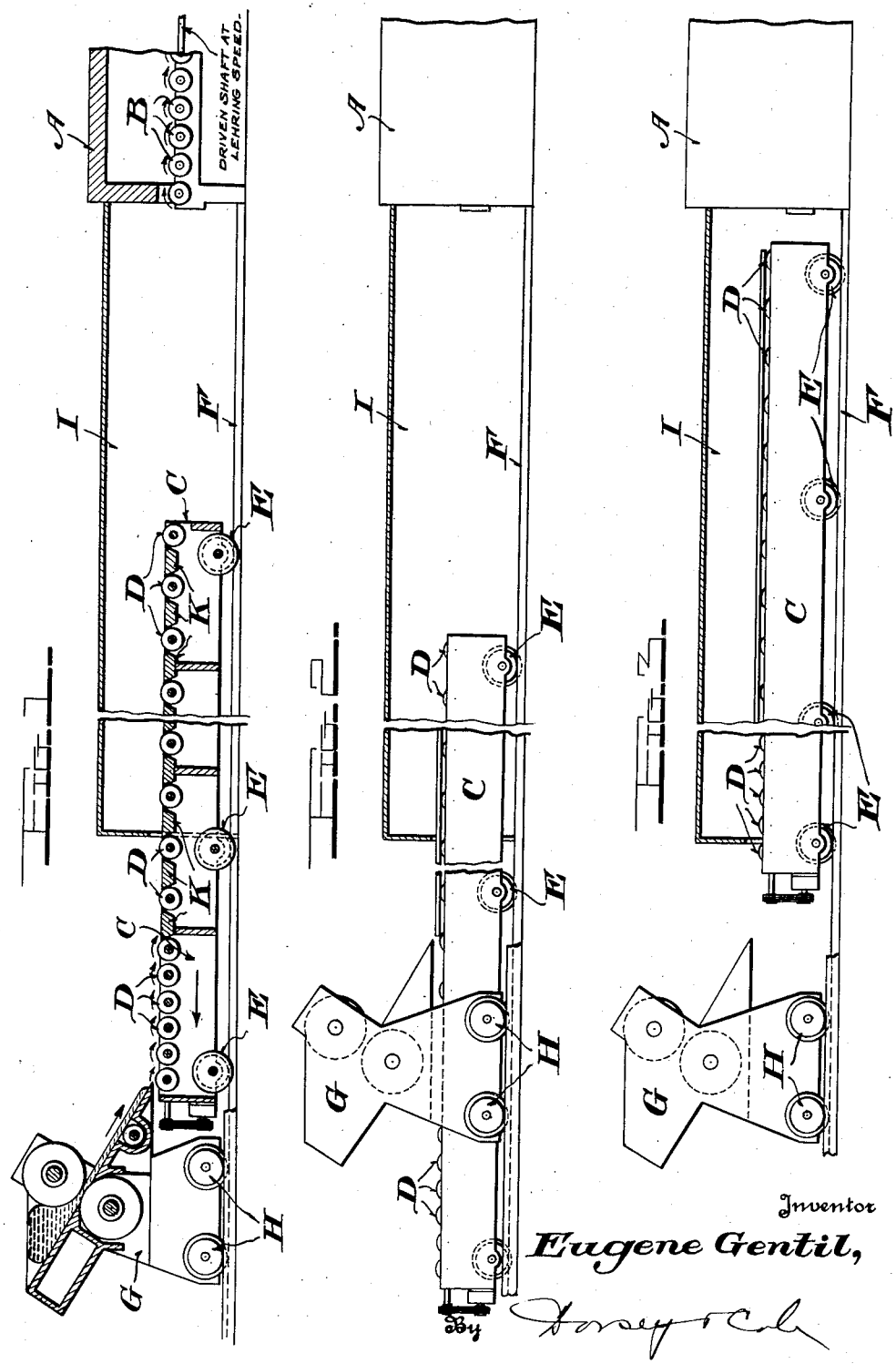

1,988,892

UNITED STATES PATENT OFFICE 1,988,892

METHOD OF AND APPARATUS FOR HANDLING GLASS SHEETS

Eugene Gentil, Paris, France, assignor to The American Bicheroux Company, Wilmington, Del.

Application May 22, 1930, Serial No. 454,690

10 Claims. (Cl. 49—3)

In the manufacture of glass by the intermittent process, it has been the practice to receive the sheet as delivered from the forming machine on a roller bed, the peripheral speed of the rollers of the bed being such as to carry away the forward end of the sheet at the speed of sheet formation as the part in the rear thereof are being formed at that speed. In order to prevent the sagging of the sheet between the rollers when shifted at this speed, it has been necessary to place the rollers at a relatively slight distance from each other, thereby adding to the expense of construction. The object of this invention is to provide a method of and apparatus for receiving glass sheets from an intermittent forming machine in which the displacement of the glass in respect to the rollers on which it is carried is substantially greater than is the sheet of speed formation, and this I accomplish by giving the glass-receiving surface formed by rollers as a whole, a motion in respect to the sheet forming apparatus, and independent of the motion of rotation of the rollers, the relative motion being in the direction in which the glass is fed in being formed. This may be done by shifting the glass-receiving surfaces rearwardly, or shifting the forming machine forwardly, or by combining the movements.

Referring to the drawing in which,—

Figure 1 is a view partly in section illustrating a mechanism suitable for carrying out the process here claimed, the parts being shown in the position they occupy at the commencement of the formation of a sheet.

Figure 2 is an elevation thereof, the parts being shown in the position they occupy when the sheet is fully formed.

Figure 3 is a similar view, with the parts in the position they occupy when the sheet is ready to be fed to a lehr.

A represents a lehr of any preferred construction having a conveying bed therein formed of rollers B, the peripheral speed of which is that proper for lehring. Opposite to and in line with the lehr conveyor is a delivering carriage C, having glass-receiving rolls D thereon, and capable of being reciprocated in the line of the lehr conveyor and of being brought up against the receiving end thereof. For this purpose it is mounted on wheels E running on a track F. Such a carriage is shown in my prior application, 297,715. G represents a forming machine having two rolls with a sheet-forming pass between them, and preferably of the Bicheroux type, capable, if desired, of moving during the formation of the sheet, along and above the carriage C. For this purpose, the forming machine may be mounted on rollers H, and provided with a suitable drive mechanism by which it may be moved lengthwise of the carriage C, as shown in the application of Max Bicheroux, 297,666. The bed formed by the rollers D has a length in excess of the length of the sheet to be formed, and the rollers D are so driven that they may be rotated first in one direction, and then in another, at a speed greater than the speed of sheet formation, and may be then slowed down to have a peripheral speed equal to the desired lehring speed, as shown in an application of Charles Heuze, Serial No. 286,684. The direction of rotation of the rolls with their upper surfaces moving in the direction of sheet formation, will be called "forward rotation", and rotation in the other direction will be called "reverse rotation". Movement of the carriage C or from machine G in the direction of sheet formation will be called "forward movement of the carriage", and movement of the carriage or forming machine G away from the lehr will be called "rearward motion of the carriage".

With the parts in the position shown in Figure 1, the forming machine G is over the rear of the carriage C, and the formation of a sheet has been started. We will presume that the speed of sheet formation is 60 feet per minute. If at this time, the carriage is moved rearwardly as indicated by the arrow, at the rate of 20 feet a minute, and if the carriage rollers D are rotated forwardly with a peripheral speed of 80 feet a minute, the head of the sheet formed by the forming machine and deposited on the carriage, will be taken away from the forming machine at the rate of 60 feet a minute, i. e., at the rate of sheet formation. At the same time the sheet is being moved in respect to the forming machine at this rate, it is being displaced in respect to the rollers D on which it is carried at a speed of 80 feet per minute, and hence it is possible with such an arrangement to use more widely separated rollers D than has heretofore been the use when the speed of movement in respect to the rolls was no higher than the speed of sheet formation.

The above presumes that the forming machine G is fixed. If, however, the latter is given a motion towards the lehr so that at the end of sheet formation it has assumed a position shown in Figure 2, the effect will be to permit the carriage rolls to be given a slightly greater peripheral speed. With all of the parts moving in the directions indicated or with the forming machine stationary, the speed of the carriage rolls is equal to the speed of sheet formation plus the speed of translatory motion of the former, plus the feed of translatory motion of the carriage.

From the above it follows that the carriage on which the rolls D are mounted may be fixed, and that the forming machine only be moved. Thus, by giving the forming machine a movement of translation of thirty feet per minute towards the lehr, and having the carriage C fixed, the rollers D may be given the speed of ninety feet a minute as before.

The sheet having been formed, and deposited on the roller D, may be fed onto the lehr conveyor by cutting down the peripheral speed of the roller D to the lehring speed. In order to prevent the sagging of the sheet during this period, it is desirable either to make the bed formed by the rollers D of considerable length to permit a more or less setting of the glass of the sheet, or, to put the rollers D in rotation the first in one direction and then in the other, at the high speed, whereby the sheet will be shifted back and forth lengthwise of the D rollers, until it becomes sufficiently set. This tends to flatten the sheet. During this period of oscillation, it is preferable to shield the sheet by running the carriage into a suitable enclosure I located in front of the lehr, as shown in Figure 1.

The initial section of rollers D, namely, those on which the forward end of the sheet is deposited at the commencement of sheet formation made under certain circumstances, be placed close together or provided with bridges to prevent that end of the sheet from entering in between the rollers D, or guard bridges K may be placed between the rollers at some distance below the plane in which their surfaces are located.

Having thus described my invention, what I desire to claim and secure by Letters Patent is:—

1. The hereinbefore described method of receiving sheet glass from a forming pass, which consists in receiving on a bed the sheet from the pass as it is being formed, shifting the sheet on the bed, and moving the bed in respect to the forming pass, the movement of the sheet on the bed being at a speed substantially greater than the speed of sheet formation.

2. The hereinbefore described method of receiving and handling sheet glass from a forming pass, which consists in receiving on a series of driven rollers the sheet from the pass as it is being formed, and moving during the period of sheet reception the rollers as a whole in respect to the pass, the rollers having a peripheral speed equal to the speed of sheet formation plus the speed of relative shift between the pass and the rollers as a whole.

3. The hereinbefore described method of receiving sheet glass from a forming pass, which consists in receiving on a series of driven rollers the sheet as it is being formed, and moving the rollers as a whole rearwardly, the rollers having a peripheral speed substantially greater than the speed of sheet formation.

4. The hereinbefore described method of receiving sheet glass from a forming pass, which consists in receiving on a series of driven rollers the sheet as it is being formed, and moving the forming pass forwardly, the rollers having a peripheral speed substantially greater than the speed of sheet formation.

5. The hereinbefore described method of receiving sheet glass from a forming pass, which consists in receiving on a series of driven rollers the sheet as it is being formed, and moving the rollers as a whole rearwardly and the forming pass forwardly, the rollers having a peripheral speed substantially greater than the speed of sheet formation.

6. The hereinbefore described method of receiving and handling sheet glass from a forming pass, which consists in receiving on a series of driven rollers the sheet from the pass as it is being formed, and moving during the period of sheet reception the rollers as a whole in respect to the pass, the rollers having a peripheral speed equal to the speed of sheet formation plus the speed of relative shift between the pass and the rollers as a whole, and then after delivery to the receiver has been effected reversing the direction of rotation of the rollers to cause a movement of the sheet in this opposite direction.

7. The combination of an intermittent sheet-forming machine, of a receiver for the glass formed thereby, the glass-receiving surface of such receiver being in the form of a series of rollers, means for moving the receiver rearwardly during the reception of the sheet, and means for rotating during the reception of the sheet the rollers forming the glass-receiving surface at a peripheral speed equal to the speed of sheet formation plus the speed of relative shift between the former and the glass-receiving surface.

8. The combination of an intermittent sheet-forming machine, of a receiver for the glass formed thereby, the glass-receiving surface of such receiver being in the form of a series of rollers, means for moving the forming machine forwardly during the formation of the sheet, and means for rotating during the reception of the sheet the rollers forming the glass-receiving surface at a peripheral speed equal to the speed of sheet formation plus the speed of relative shift between the former and the glass-receiving surface.

9. The combination of an intermittent sheet-forming machine, of a receiver for the glass formed thereby, the glass-receiving surface of such receiver being in the form of a series of rollers, means for moving the forming machine forwardly and the receiver rearwardly during the formation and reception of the sheet, and means for rotating during the reception of the sheet the rollers forming the glass-receiving surface of the receiver at a peripheral speed equal to the speed of sheet formation plus the speed of relative shift between the former and the glass-receiving surface.

10. The combination of an intermittent sheet-forming machine, of a receiver for the glass formed thereby, the glass-receiving surface of such receiver being in the form of a series of rollers, means for shifting the receiver and the glass-forming machine relatively to each other during the reception of the sheet, and means for rotating during the reception of the sheet the rollers forming the glass-receiving surface of the receiver at a peripheral speed equal to the speed of sheet formation plus the speed of relative shift between the former and the glass-receiving surface, and after the reception of the sheet has been effected for reversing the direction of rotation of the rollers.

EUGENE GENTIL.